United States Patent [19]

Bortnik et al.

[11] Patent Number: 4,491,568
[45] Date of Patent: Jan. 1, 1985

[54] SYSTEM FOR RECYCLING FINES TO HOLLOW ELECTRODE

[75] Inventors: John F. Bortnik; Donald A. Clayman, both of Ashtabula; Scott A. Baker, Conneaut, all of Ohio

[73] Assignee: Elkem Metals Company, Pittsburgh, Pa.

[21] Appl. No.: 499,815

[22] Filed: Jun. 1, 1983

[51] Int. Cl.³ ............................................. C01B 31/32
[52] U.S. Cl. .................................. 423/442; 423/441; 373/82
[58] Field of Search .................. 423/441, 442; 373/82

[56] References Cited

U.S. PATENT DOCUMENTS

| | | | |
|---|---|---|---|
| 2,996,360 | 8/1961 | Kuhlmann | 423/442 |
| 3,010,796 | 11/1961 | Alexander | 423/442 |
| 3,471,626 | 10/1969 | De Weese et al. | 373/82 |
| 3,585,269 | 6/1971 | Krause et al. | 373/82 |
| 4,213,955 | 7/1980 | Casciani et al. | 423/442 |

Primary Examiner—John Doll
Assistant Examiner—Steven Capella
Attorney, Agent, or Firm—Lucas & Just

[57] ABSTRACT

The present invention is directed to process and apparatus for mixing finely divided calcium carbide and finely divided lime and carbonaceous material and for feeding the mixture down through the aperture of a hollow electrode in a calcium carbide electric furnace. In a preferred embodiment the finely divided calcium carbide is supplied to the aperture of the hollow electrode by a first conveyor and a fine feed mix of lime and carbonaceous material is supplied to the aperture of the hollow electrode by a second separate conveyor and the two are mixed in fluidized condition and fed down through the aperture of the electrode into the reaction zone of the furnace. Carbon monoxide off-gas from the furnace is preferably used for fluidizing the respective particles.

7 Claims, 7 Drawing Figures

SYSTEM FOR RECYCLING FINES TO HOLLOW ELECTRODE

This invention is directed to a process and apparatus for feeding two or more finely divided materials into an electric furnace through a hollow electrode. More particularly, the invention is directed to a process and apparatus for feeding calcium carbide, lime and carbonaceous fines through a hollow electrode used in the production of calcium carbide.

It is well known to produce calcium carbide in an electric furnace by heating a mixture of lime and carbonaceous material such as coke coal or charcoal which is converted in the heat of the furnace to calcium carbide and carbon monoxide. The minimum size of raw materials in the charge is conventionally controlled to insure satisfactory porosity in the unfused material in the furnace. Control of the size of raw materials naturally results in finely divided under sized particles for disposal. Hollow electrodes which became available over twenty years ago made it possible to feed a mixture of lime and carbonaceous fines into the furnace through the aperture in the electrode whereby the finely divided materials are reacted at the bottom tip of the electrode and the desired porosity in the charge is maintained.

The crushing and sizing of calcium carbide ingots from the furnace results in dust and undersized particles which cannot be dumped because of the explosive nature of acetylene gas that is generated by mixing calcium carbide with water. These calcium carbide fines have been recycled to the furnace but recycling the calcium carbide fines created a number of problems when using the recycling system described in U.S. Pat. Nos. 2,996,360 and 3,471,626 and in the article by D. E. Hamby at page 208 of Electric Furnace Proceedings 1966.

First of all, mixing the calcium carbide fines with the lime and carbonaceous fines is undesirable because of the hazard of generating explosive acetylene gas from residual moisture in the lime and carbonaceous materials. Alternate feeding may be employed but this curtails furnace operation and electrode consumption may be increased by about 67% due to the carbon starved zone created at the electrode tip by the calcium carbide fines. This in turn reduces the furnace operating load by about 20% because of the inability to achieve sufficient length of electrode in the furnace. The change in composition changes electrical resistance and causes rough furnace conditions resulting in poor efficiency and poor quality. The alternate feeding reduces the amount of lime and carbonaceous fines that may be fed to the furnace in a given period of time which leaves more lime fines for disposal and reduces the use of inexpensive Breeze coke.

These problems have now been overcome by the recycling system of the present invention wherein the calcium carbide fines are fed to the aperture in the hollow electrode while the lime and carbonaceous fines are separately fed to the aperture. In the preferred embodiment, a mixture of lime fines and fines of carbonaceous material are fed in one delivery system while the calcium carbide fines are simultaneously fed in a second delivery system. The three different types of fines are mixed preferably just before entering the aperture in the hollow electrode. Best results are achieved by fluidizing the fines in a suitable gas which is preferably the carbon monoxide furnace off-gas recycled for this purpose.

In a second preferred embodiment of the present invention, a dual screw system is employed which utilizes two separate variable speed screw conveyors. One conveyor preferably delivers a fine feed mix of lime and carbonaceous fines and a second separate conveyor delivers the calcium carbide fines for mixing under fluidized conditions in carbon monoxide gas recycled from the furnace. The recycled carbon monoxide gas overcomes the back pressure in the aperture in the hollow electrode so that the fines can readily move down into the furnace through the hollow electrode aperture. It will be understood that the term fine feed mix used in the specification and claims is intended to mean a mixture of lime fines and fines of carbonaceous material. While the simultaneous feeding and mixing of the fine feed mix and calcium carbide fines achieves the best results in accordance with the present invention, interrupted spurts of feeding may be employed provided that a carbon starved zone only temorarily occurs and does not continue at the electrode tip due to the manner of feeding the calcium carbide fines.

As will be obvious to those of skill in the art, other calcium containing materials such as flourspar may be used in known manner in place of the lime. The gas employed may be used as a carrier for the fines or the particles may free-fall and mix as they travel down through the aperture in the hollow electrode. Best results and maximum advantages are achieved in accordance with the present invention by fluidized mixing of the fines and by using gas to overcome back pressure in the aperture in the hollow electrode. For this purpose, any gas such as carbon monoxide, carbon dioxide, natural gas, nitrogen, argon, helium and the like may be employed. The gas is preferably inert to the raw materials and inert to the reaction products. If the selected gas evolves oxygen, it is desirable to use a reactive form of carbon such as charcoal or low temperature coke to react with the oxygen and thereby prevent the oxygen from reacting with the hollow electrode.

During calcium carbide production, particles of about one-quarter inch and smaller are usually screened out of the charge as fines to be recycled as a fine feed mix back to the hollow electrode. The calcium carbide fines in accordance with the present invention are preferably those which pass through an 8 mesh screen. While the present invention is particularly directed to obtain maximum advantages from recycling fines of the above specified sizes and smaller, it will be understood that larger particles preferably less than about one inch and smaller may be fed to the aperture in the hollow electrode with advantage.

Although not critical to the successful use of the present invention, it is desirable that the aperture in the hollow electrode have a diameter of at least about eight times the diameter of the largest size particles being passed therethrough. This will tend to insure a free fall of the particles through the hollow electrode aperture.

The hollow electrode used in accordance with the present invention may be any of those conventionally used in producing calcium carbide in an electric furnace. The electrode is usually operated to provide a submerged arc and it may be either one of the well known prebaked or self-baking types that use amorphous or graphitic carbon. The electrode may have one or more apertures for feeding of charge into the furnace but in general a single aperture is preferred. While the invention is particularly directed to the production of calcium carbide in an electric furnace, it will be apparent to those of skill in the art that the system in accordance with the present invention may be used to advantage for treatment of fines in connection with the production of any product in an electric furnace equipped with hollow electrodes.

One preferred embodiment of apparatus used in accordance with the system of this invention is illustrated in the drawings in which.

Figure 3:
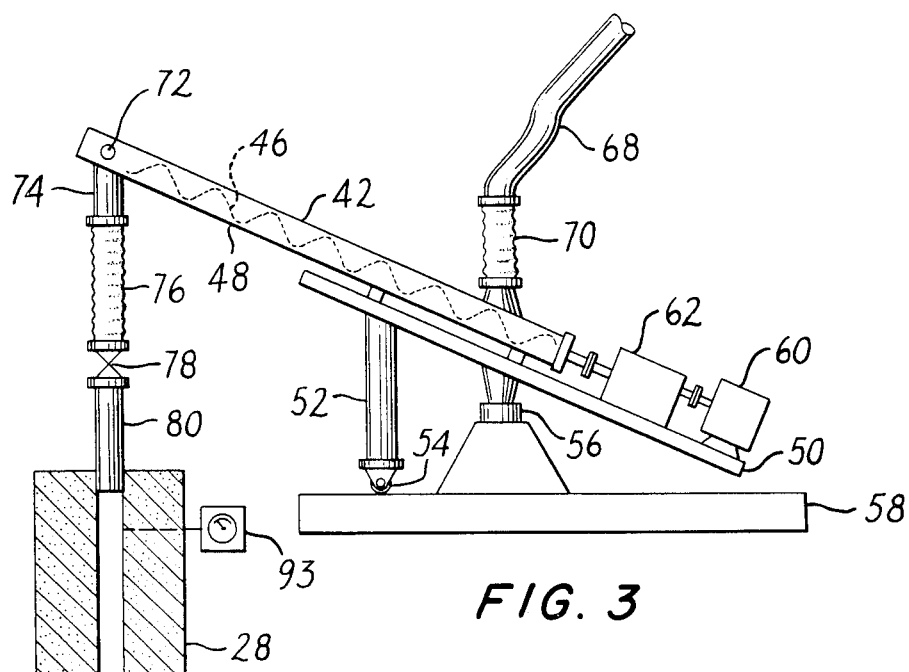
FIG. 3 illustrates in a side view of one of the dual variable speed screw conveyors.
Figure 1:
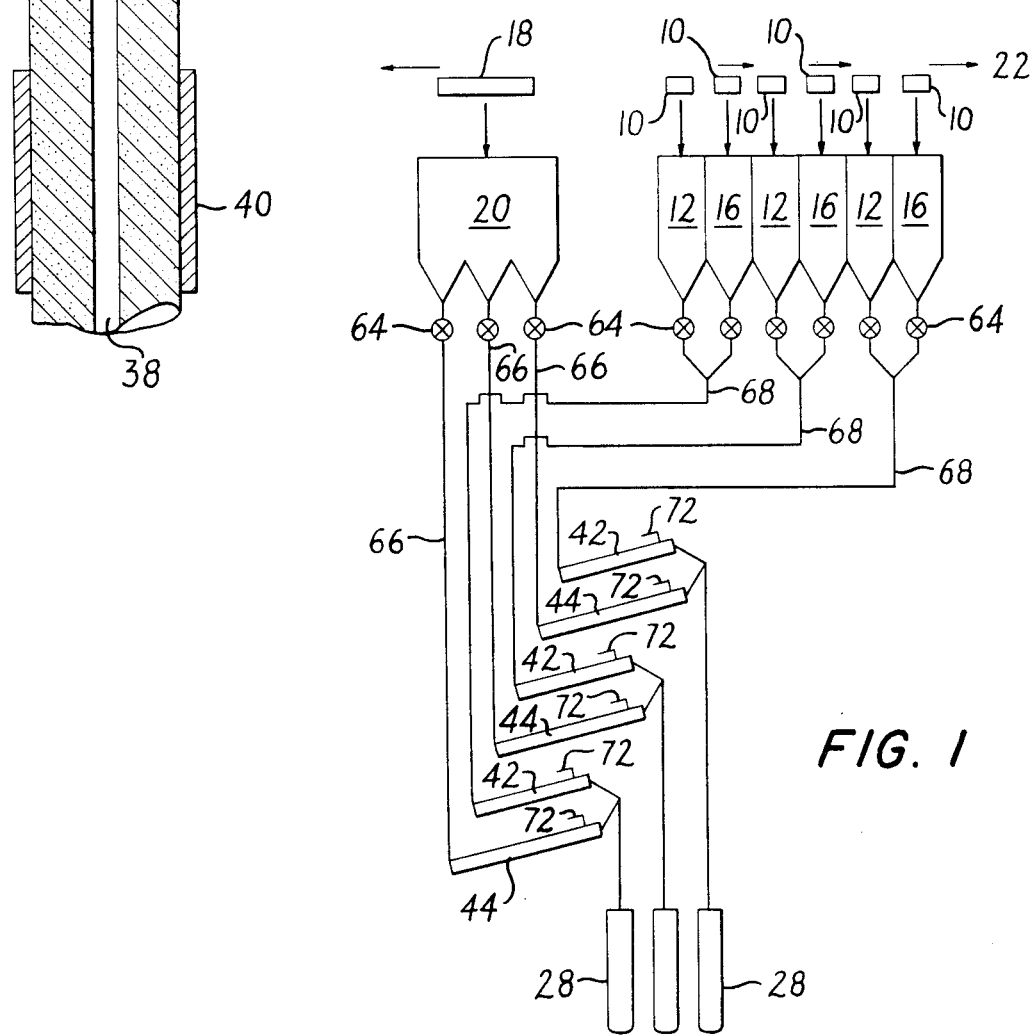
FIG. 1 is a schematic illustration of the flow of calcium carbide, lime and carbonaceous fines in the system of the present invention.

Turning now to FIG. 1, 10 illustrates the screening out of fines of carbonaceous reducing material and of lime-fines which are pneumatically fed to the fines bins 12 and 16 in known manner. Crushed calcium carbide ingot is screened at 18 and the fines are collected in bin 20. As illustrated at 22 the coarse particles of lime and carbonaceous reducing material are fed to the submerged arc electric furnace illustrated at 24 where a mixture of coarse particles of lime and carbonaceous reducing material enters the furnace through one or more charge ports 26 to surround the electrodes 28 in known manner. Electric arc voltage is applied in conventional manner to each one of the electrodes 28 as illustrated for only one of the electrodes shown in the drawing by an electric supply line 30 which is also connected to an electrically conductive button 32. An arc is thereby initiated and maintained at the bottom tip of each of the electrodes. The submerged arc generates the heat required for reaction between the lime and carbonaceous reducing material to produce molten calcium carbide and carbon monoxide gas in known manner. The molten calcium carbide is periodically withdrawn from the furnace through outlet port 34 and the carbon monoxide gas leaves the furnace at 36. As shown in FIG. 3 each of the electrodes 28 has an aperture 38 that extends through the electrode for feeding a fine feed mix into the furnace. The electrodes are supported to move up and down in the furnace in known manner and each electrode has a conventional slipping mechanism as illustrated at 40 which allows the electrode to slip down and compensate for electrode consumption in the furnace.

The drawing illustrates a submerged arc electric furnace having three electrodes but this is not necessary and the furnace may have a single or a plurality of electrodes. Each electrode 28 illustrated in the drawing has an aperture but solid electrodes without an aperture may also be used provided that at least one electrode in the furnace has an aperture therein for feeding fines into the furnace in accordance with the present invention.

The screening of the charge, screening of crushed calcium carbide ingots, operation of the electric furnace to produce calcium carbide are conventional steps well known in the art. The charge to the furnace is usually in substantially stoichiometrical proportions but this may be varied depending on the furnace and charge at hand. In general, it may be desirable to have a 5 to 20 weight percent excess of lime over the stoichiometric proportion.

In accordance with the present invention, one or more of the electrodes 28 is provided with a first variable speed screw conveyor 42 and with a second separate identical variable speed screw conveyor 44. The conveyors have a six inch pitch screw 46 enclosed in a six and one-half inch casing 48. The conveyors are arranged to accommodate the available space and are placed at an angle to rise above each of the electrodes 28 A, B and C. The conveyors are mounted in any convenient manner on a support assembly which preferably permits the dual variable speed conveyors to move and adjust to electrode movement. For this purpose, the dual conveyors are mounted adjacent to each other on a support platform 50 having a post 52 that may move on wheel 54 and a swivel mount 56 which rest on a stationary platform 58. The screw 46 is driven by a 3 horse power electric motor 60 through a speed reducer 62 to rotate at a variable speed in the range of about four to about thirty revolutions per minute.

The submerged arc electric furnace 24 has a conventional three phase electrical system for the three hollow electrodes 28 each of which are forty two inch diameter self-baking electrodes having an aperture 38 of about four inches in diameter. The furnace can operate at loads as high as 23 megawatts and produce up to nine tons of calcium carbide per hour when recycling about 1,200 pounds of calcium carbide fines per hour.

The bins 12 and 16 are pneumatically fed with fines in conventional manner and each contains about three tons of a different mix ratio of from about 100 percent of lime to about 100 percent of coke fines and dust. Bin 20 contains about fifteen tons of calcium carbide dust and fines which is supplied to the bin by five ton containers via a nitrogen purged conventional chain link conveyor. Each bin has a high and low bin level indicator which automatically cut off delivery of fines to the bins when the level is high and automatically cut off the supply of fines to the conveyors when the level is low. The bin slide gates 64 are automatically closed to maintain a seal at the feed end of the conveyors to prevent the loss of gas from the system when the bins fall below the set minimum level of dust and fines. Bin 20 is constantly vented to prevent accumulation of acetylene.

The proportions of fines fed to the conveyor system is automatically controlled for the furnace operation at hand. As illustrated in FIG. 1, the finely divided calcium carbide from bin 20 is fed to conveyors 44 through feed conduits 66 while the finely divided carbon and finely divided lime mixture is fed to conveyors 42 through feed conduits 68. The proportion of lime and coke to conveyors 42 in conduits 68 is automatically controlled to supply the selected proportions of ingredients in the fine feed mix. The proportion may vary from 0% to 100% lime and from 0% coke to 100% coke depending on furnace requirements. Each of the feed conduits to the conveyors are connected by flexible connectors 70 which accommodate for movement of the conveyors. An inert gas is supplied into the finely divided material at the exit end of each conveyor through an inlet port 72 which fluidizes the finely divided particles which in fluidized condition are delivered into a common "Y" hopper 74 for mixing and delivery through a flexible connector 76 which feeds the fluidized mixture through valve 78 into the inlet pipe 80 of aperture 38 of the hollow electrode.

Figure 2:
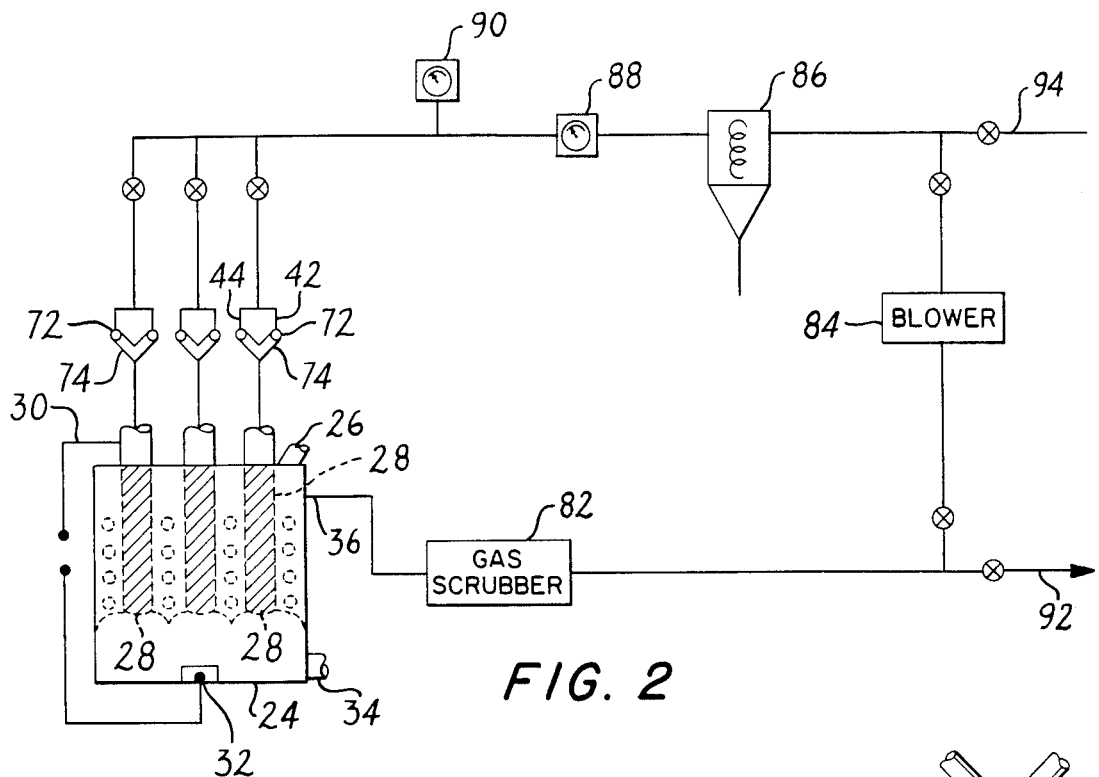
FIG. 2 is a schematic illustration of the flow of gas from the electric furnace used to fluidize and mix the fines charged to the aperture of the hollow electrode.
Figure 5:
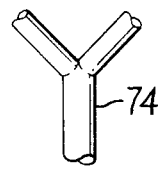
FIG. 5 illustrates one form of a mixer and connector for the aperture in the hollow electrode.
Figure 4:
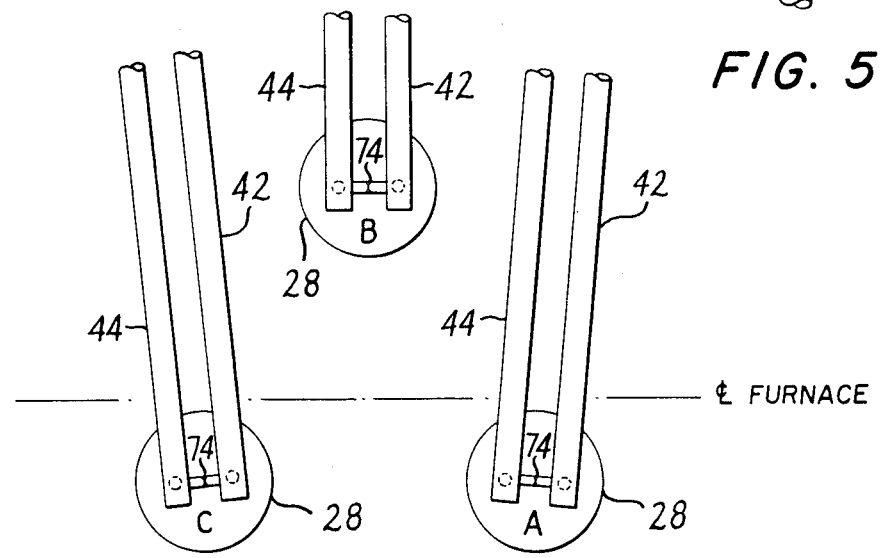
FIG. 4 is a top view to illustrate one arrangement of the dual variable speed screw conveyors with respect to the hollow electrodes.

Best results are obtained by using carbon monoxide gas from the furnace for fluidizing the fines delivered by the conveyors. For this purpose, the carbon monoxide gas from furnace 24 (FIG. 2) passes at 36 into a conventional gas scrubber 82 and is moved by blower 84 through a conventional water separator 86 which separates out particulate water suspended in the gas. A flow regulator 88 maintains the gas pressure at about thirty inches of water for supplying fluidizing gas to each one of the conveyors at 72. A moisture sensor 90 monitors the relative humidity of the gas and will sound an alarm at about ninety percent relative humidity. The average flow of fluidizing gas through each electrode aperture is about forty cubic feet per minute. The pressure in each hollow electrode aperture is monitored as at 93. An alarm is sounded when the pressure in the aperture 38 is below about twelve inches of water or above about twenty two inches of water. This monitoring will automatically stop the conveyor screws when the pressure is above or below the set pressures in order to prevent apertures 38 from being plugged with the fines. Excess carbon monoxide gas goes to the furnace stack at 92. A back up nitrogen gas supply is available for fluidizing the fines at 94. If there should be excess moisture in the carbon monoxide gas the operation is switched over to the back up nitrogen gas. In the drawings "X" indicates valves that are employed to control the system. The system of the present invention is preferably under conventional automatic computer control as to proportions and flow of materials as is the operation of the submerged arc electric furnace.

Since the calcium carbide fines are not mixed with the fine feed mix until after suspension in the carbon monoxide gas, the hazard of generating explosive acetylene from latent moisture in the fine feed mix is substantially eliminated. Furthermore, the moisture content of the carbon monoxide furnace off-gas is monitored and the back up nitrogen gas supply at 94 may be used if the moisture in the carbon monoxide gas exceeds the known acceptable limits. As compared to use of about nine thousand cubic feet of nitrogen gas per ton of recycled fines used with alternate feeding of calcium carbide fines and fine feed mix, the system of the present invention only uses about 0.50 thousand cubic feet of nitrogen gas per ton of recycled fines which very materially reduces the cost of operation.

The independent operation of the separate delivery systems for the calcium carbide dust and fines and the delivery system for the fine feed mix provides great versality in furnace operation. Changing delivery speeds of the fine feed mix by changing screw conveyor speed makes possible a wide range of effective operative modes while recycling the calcium carbide fines.

The volume of fines that can be fed through the aperture of the hollow electrode depends on furnace electric power input and operating conditions that affect the column resistance in aperture 38. Once the desired calcium carbide recycling rate has been established and the total volumetric feed rate has been maximized by adjustment of the speeds of the screw conveyors 44, the desired fine feed mix can then be calculated and adjusted for maximum efficiency. For consistent furnace conditions, the volume of fines delivered may be maintained in balance by speeding up or slowing down the screws of conveyors 44 for calcium carbide fines and the fine feed mix screws of conveyors 42 may also be adjusted to maintain the desired consistent stoichiometry. It will be appreciated that the calcium carbide fed to the furnace is not considered part of the furnace charge for calculation purposes.

The system for processing fines of the present invention may be used to control the electrode penetration. If less penetration is desired, the speed of the fine feed mix screw 42 can be increased temporarily while the speed of the screw 44 for the calcium carbide fines is reduced. If greater electrode penetration is desired, the calcium carbide fines screw 44 can temporarily be increased while the speed of screw 42 for the fine mix feed is reduced. If changes are urgent, only one screw or the other may be temporarily operated.

As compared to the alternate feeding of calcium carbide and fine feed mix the system of the present invention provides the advantages of:
1. Safe furnace operation and greater operating time;
2. A material reduction in electrode consumption;
3. An increase in operating loads;
4. Smoother furnace operation with better quality product;
5. Volume of fine feed mix processed in the furnace was increased to 80,000 to 100,000 pounds per day;
6. Use of nitrogen gas was reduced to 0.50 thousand cubic feet per ton of recycled fine feed mix.

A typical example of furnace operation while recycling calcium carbide fines and fine feed mix is as follows:

| | |
|---|---|
| Furnace load | 21,000 KW |
| Taphole Production | 7.9 NT/hr - 190 NT/day |
| Carbide Product Gas Quality | 4.90 Ft.$^3$ Acetylene/pound $CaC_2$ |
| Carbide Recycling Rate | 1,240 lbs/hr - 29,700 lbs/day |
| $CaC_2$ Dust Gas Quality | 3.60 Ft.$^3$/lb. |
| % $CaC_2$ Fines of Total Mix | 5.9% |
| $CaC_2$ Fines Screw Speeds | Electrode A and C 9.0 RPM - B 11.0 RPM |
| % Operating Time $CaC_2$ Screws | 45% |
| $CaC_2$ Screw Delivery Rate | 1.7 lb/Revolution |
| $CaC_2$ Sizing | Through 8 mesh screen |
| Fine Feed Mix Usage | 3940 lbs/hr - 94,500 lbs/day |
| % Fine Feed Mix of Total | 18.9% |
| Fine Feed Mix Screw Speed | Electrode A and C 24 RPM - B 30 RPM |
| % Operating Time Fine Feed Mix Screws | 70% |
| Fine Feed Mix Screw Delivery Rate | 1.2 lb/Revolution |
| Mix Ratio of Fine Feed Mix | 56% Coke, 44% Lime |
| Fine Feed Mix Sizing | |
| Lime | Through ⅛ inch Screen |
| Coke | Through 3/16 inch Screen |
| CO Feed Gas Column Pressure (38) | 20 inches water |
| CO Flow Rate (38) | 40 cubic feet/Minute |
| Moisture in CO | 65% Relative Humidity |

Figure 6:
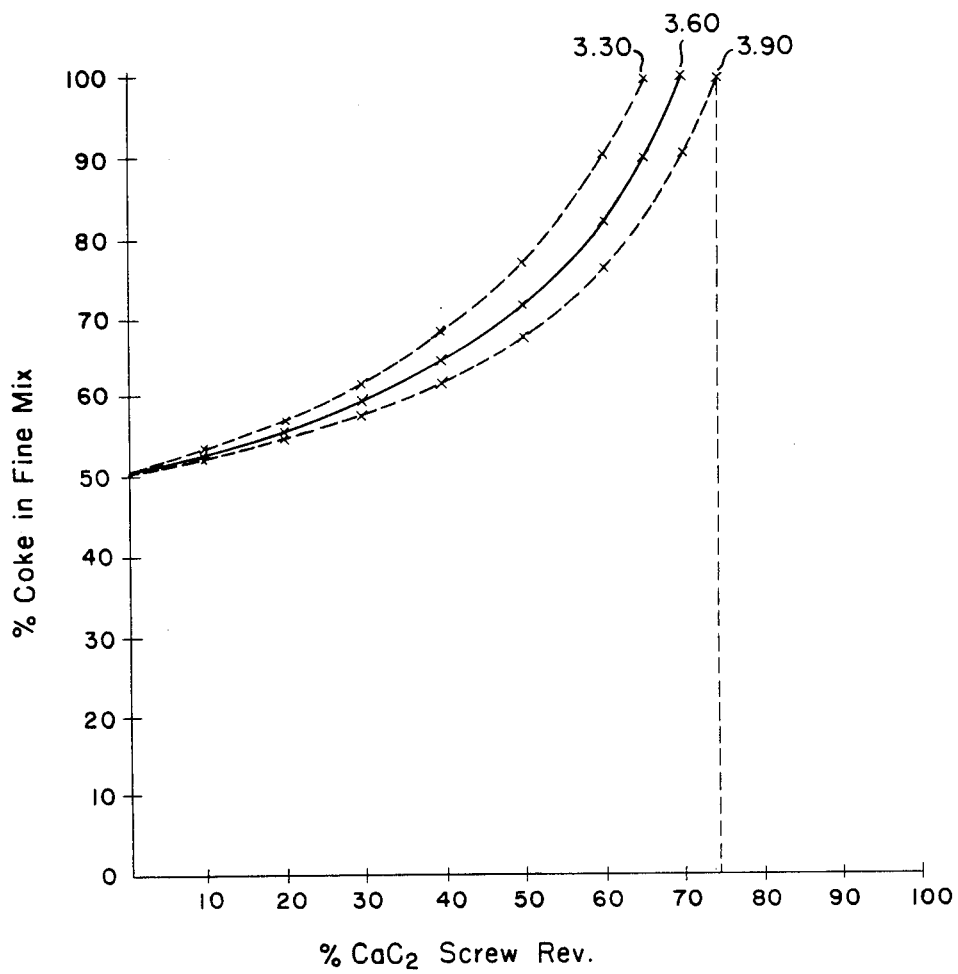
FIGS. 6 and 7 are graphs that illustrate the proportions of fines with respect to conveyor screw delivery.

While the foregoing illustrates a typical furnace operation, furnace operating conditions often change and the recycling of fines is changed accordingly. For example, the desired calcium carbide fines recycling rate may be reduced to 20,000 pounds per day or about 6 RPM. Assume that furnace conditions allow for the fine feed mix screws to operate at 28 RPM (102,000 lbs/day). Now the "percent $CaC_2$ Screw Revolution" is 6/34 = 18% and from Graph I of FIG. 6 it can be determined that the new fine feed mix ratio should be 54% coke and 46% lime to maintain furnace metallurgy.

Figure 7:
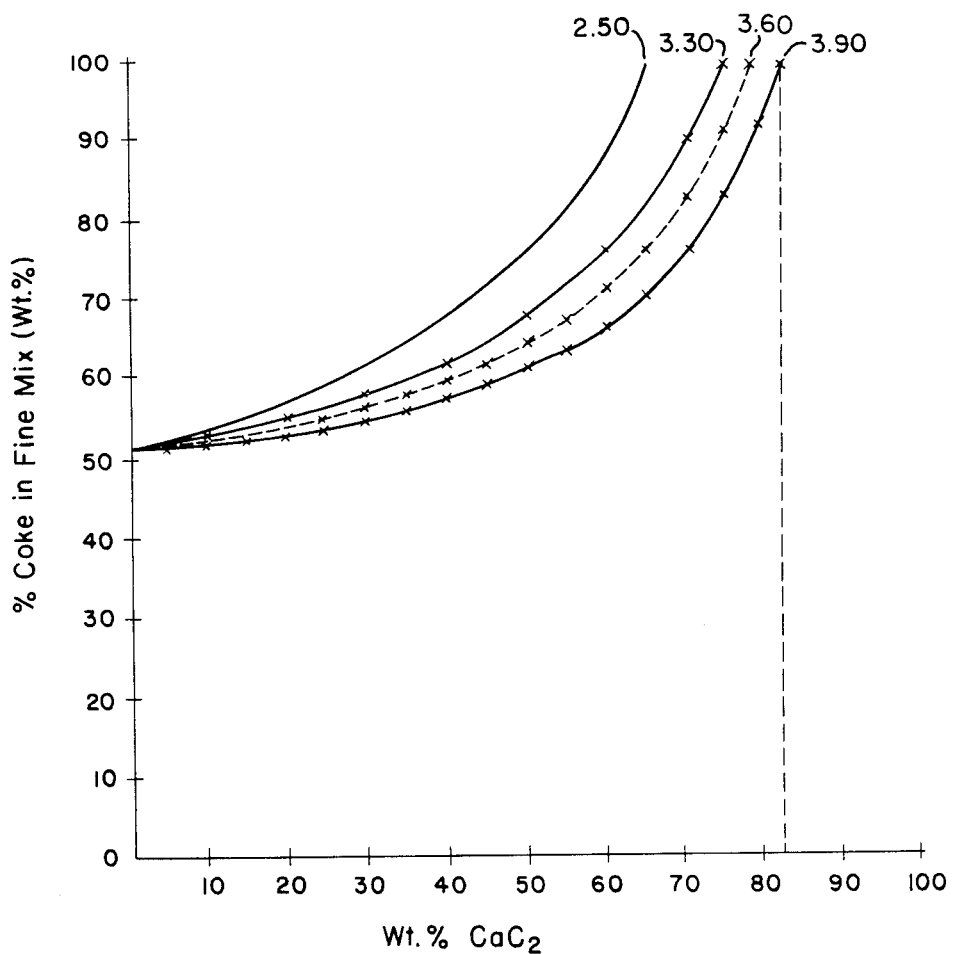

The output per revolution of a screw conveyor depends on its physical condition. If two screw conveyors deliver different volumes per revolution then it may be necessary to use GRAPH II of FIG. 7. In such case and using the above example, the "weight percent of $CaC_2$" is 20,000 divided by 122,000 which equals 16.5% and again the fine feed mix ratio should be 54% coke and 46% lime. If all the screws are different, it may then be necessary to calculate a different fine feed mix ratio for each electrode.

The quality of carbide dust varies from about 2 cubic feet per pound to about 4.2 cubic feet per pound. The five ton containers are tested and blended in such a way to maintain a 3.6 cubic foot per pound average in the carbide bin 20. However, when this blending is impractical, the fine feed mix ratio can be changed with reference to GRAPHS I and II.

A typical example of overall furnace operation over a period of one week was as follows:

| | |
|---|---|
| Taphole Production | 1304 N.T. |
| $CaC_2$ Fines Recycled | 132.5 N.T. |
| Net Production | 1207.5 N.T. |
| $CaC_2$ Fines of Total Mix | 7.6% |
| Operating Time | 97.9% |
| Average Load While Operating | 21,226 KW |
| Efficiency | 1.45 KW/lb. |
| Electrode Consumption | 26.6 lbs. Electrode/NT $CaC_2$ |

It will be noted that Efficiency and Electrode Consumption are calculated from the net calcium carbide production and that recycled calcium carbide is not considered part of the furnace mix for calculating purposes. Therefore, the percent of $CaC_2$ fines of total fine feed mix is recycled $CaC_2$ divided by the total lime and coke usage.

It will be understood that it is intended to cover all changes and modifications of the preferred embodiment of the invention herein chosen for the purpose of illustration which do not depart from the spirit and scope of the invention.

What is claimed is:

1. A process for feeding finely divided calcium carbide into the aperture of a hollow electrode in a calcium carbide electric furnace which comprises the steps of mixing carbonaceous reducing material with lime to form a fine feed mix, feeding the fine feed mix to the aperture of the hollow electrode, separately feeding finely divided calcium carbide to the aperture of the hollow electrode and passing the fine feed mix and calcium carbide particles down through the aperture into the reaction zone at the bottom of the electrode.

2. The process of claim 1 which includes the step of mixing the calcium carbide and fine feed mix and then feeding the mixture down through the aperture of the electrode.

3. The process of claim 1 which includes the steps of mixing the calcium carbide particles and fine feed mix under fluidized conditions established by a supply of gas for fluidizing the particles and then passing the fluidized particulate mixture down through the aperture of the electrode and into the reaction zone in the furnace.

4. The process of claim 3 which includes the steps of feeding gas into the fine feed mix to fluidize the particles and feeding gas into the finely divided calcium carbide to fluidize the particles and then mixing the fluidized particles of calcium carbide with the fluidized particles of fine feed mix and passing the resulting mixture down through the aperture of the hollow electrode and into the reaction zone of the furnace.

5. The process of claim 1 in which the finely divided calcium carbide particles and particles of fine feed mix are simultaneously passed down through the aperture of the hollow electrode in order to mix the two therein.

6. A process for recycling finely divided calcium carbide through the aperture of a hollow electrode in a calcium carbide electric furnace which comprises the steps of mixing particulate carbonaceous reducing material with particulate lime and feeding the resulting mixture to the aperture of the hollow electrode, separately feeding finely divided calcium carbide to the aperture of the hollow electrode, feeding a gas to the aperture of the hollow electrode, fluidizing and mixing the particles of calcium carbide and lime and carbonaceous material in said gas and then feeding the resulting mixture down through the aperture of the hollow electrode into the reaction zone of the furnace.

7. The process of claim 6 in which the gas is carbon monoxide furnace off-gas which is fed to the aperture of the hollow electrode under sufficient pressure to overcome the back pressure of furnace gas in the aperture.

* * * * *